Patented Apr. 29, 1924.

1,492,214

UNITED STATES PATENT OFFICE.

ERNST FRIEDRICH MÜLLER, OF HAMBURG, GERMANY, ASSIGNOR, BY MESNE ASSIGNMENTS, TO P. BEIERSDORF & CO., INC., A CORPORATION OF NEW YORK.

MILK PREPARATION FOR PARENTERAL INJECTIONS AND PROCESS OF PRODUCING THE SAME.

No Drawing.   Application filed August 30, 1921. Serial No. 496,964.

*To all whom it may concern:*

Be it known that Dr. ERNST FRIEDRICH MÜLLER, citizen of Germany, residing at Hamburg, Germany, has invented new and useful Improvements in Milk Preparations for Parenteral Injections and Processes of Producing the Same (for which I have filed applications in Austria, on August 20, 1918; in Hungary, on August 21, 1918; and in Switzerland, on August 23, 1918), of which the following is a specification.

It has heretofore been observed that in certain maladies the injection of milk has apparently had a beneficial effect. The beneficial effects were, however, in many cases, outweighed or counteracted by certain other injurious effects which resulted, such, for example, as the formation of abscesses, the setting up of high or fever temperatures, the developing of pains, and other unpleasant and disagreeable phenomena. These injurious effects, even when the milk was thoroughly sterilized, persisted in evidencing themselves, with the result that the practice of milk injection was not accepted as a sound or reliable principle for the treatment of diseases. I have found that the albumen which is present in milk has generally incorporated or associated therewith other materials which tend to set up in the milk the conditions which were found to be harmful and that the chief agencies which cause injurious effects are the fatty substances contained in the milk, as well as the poisonous toxins formed by the bacteria before sterilization, and the corpses of the dead bacteria themselves. It seems to be the introduction of these enumerated harmful elements into the human body which is the chief source of the injurious effects which have been observed. I have therefore found that it is not enough to sterilize the milk thoroughly, so as to destroy the bacteria contained therein, because in that case the dead bacteria will remain in the preparation, but it is essential that the milk shall be sterilized at a time and under conditions which exclude, so far as possible, any growth of bacteria and any effective action of the bacteria on the constituents of the milk, but more especially conditions which will result in the immediate separation of the fatty substances of the milk after extraction from the udder and before there is a possibility of the formation of poisonous toxins or any introduction or growth of bacteria. The object of this invention is therefore to prepare from milk or similar albuminous solutions a liquid suitable for parenteral injections, the use of which liquid will, with certainty, be unattended by the harmful effects above noted. The invention consists, therefore, in the use of a milk from which the fatty substances have been extracted and removed immediately after the milk is obtained from the udder of the animal and under conditions such that germs and bacteria shall have no opportunity to find lodgment or to develop growth therein. The process employed in the preparation of the milk consists in following the extraction of the milk from the animal by immediate separation of the fatty substances therefrom. This may, of course, be done by any of a number of well-known processes, but the critical feature is that the separation of the fatty substances must follow immediately and without loss of time after the milk is first obtained from the animal. Then, the fatty substances having been removed, the milk must be filled, without the least delay, in suitable receptacles such as ampuls, which can be promptly sealed and in which, thereafter, the milk is subjected to extended heat treatment for the destruction of such small numbers of bacteria as may be present and for the prevention of any growth of germs. By following this process it will be observed that the milk cannot possibly be infected by bacteria entering the milk from an outside source. It will also be observed that, there being practically no bacteria in the fresh milk and no fatty substances with which to react, there will be practically no material number of corpses of bacteria in the product nor any toxins formed during the process in any quantity that plays a rôle.

What I claim is:

1. A milk preparation suitable for parenteral injections without producing injurious phenomena, consisting of a milk derivative in a hermetically sealed vial, said milk derivative being substantially free from toxins or corpses of bacteria and consisting essentially of a completely sterilized lean milk body, unaffected by air and of a character differing from ordinary lean milk in that said milk body was never subject, for any substantial period of time following milking, to association with the usual lighter fatty constituents of fresh milk.

2. As a new product a milk derivative in an air-tight receptacle, said milk derivative being lean milk, produced substantially as described, and characterized by substantial freedom from separable milk fats, toxins, corpses of bacteria and products of reaction between milk and air and by the fact that, when parenterally injected into the human organism it does not produce abscesses, fever temperature and pains.

3. The process of preparing a milk substance suitable for injection, which consists in taking fresh milk from an animal and then immediately and under conditions such that no substantial number of bacteria have an opportunity to find lodgment therein removing therefrom the fatty substances contained in the milk, then enclosing the lean residue thus obtained in vials, sealing the same, and then thoroughly and completely sterilizing the contents.

In testimony whereof I have signed my name to this specification in the presence of two subscribing witnesses.

Dr. ERNST FRIEDRICH MÜLLER.

Witnesses:
 WILLY GARMAN,
 WALTER THIES.